United States Patent
Ramsay

(10) Patent No.: US 7,887,119 B2
(45) Date of Patent: Feb. 15, 2011

(54) FRONT FASCIA PLASMA-INDUCED DRAG REDUCTION DEVICE

(75) Inventor: Thomas Ramsay, Worthington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 12/237,931

(22) Filed: Sep. 25, 2008

(65) Prior Publication Data

US 2010/0072777 A1   Mar. 25, 2010

(51) Int. Cl.
*B60J 7/00* (2006.01)
(52) U.S. Cl. .................................................. 296/180.1
(58) Field of Classification Search ............. 296/180.1, 296/180.2, 180.4; 244/3.22
See application file for complete search history.

(56) References Cited

U.S. PATENT DOCUMENTS

| | | | |
|---|---|---|---|
| 4,772,060 A | 9/1988 | Kretschmer | |
| 5,692,796 A | 12/1997 | Yamamoto et al. | |
| 5,863,090 A | 1/1999 | Englar | |
| 6,200,539 B1 | 3/2001 | Sherman et al. | |
| 6,575,522 B2 | 6/2003 | Borghi et al. | |
| 7,066,431 B2 | 6/2006 | Scott et al. | |
| 7,322,638 B2 | 1/2008 | Larson | |
| 7,624,941 B1 * | 12/2009 | Patel et al. | 244/3.22 |

* cited by examiner

*Primary Examiner*—Joseph D Pape
(74) *Attorney, Agent, or Firm*—Mark E. Duell; Rankin Hill & Clark LLP

(57) ABSTRACT

A plasma-induced drag reduction device is mounted on an underside of a vehicle front fascia. The drag reduction device has a dielectric substrate formed of a dielectric material, a first electrode mounted on a bottom, exposed surface of the dielectric substrate, and a second electrode mounted a top surface of the dielectric substrate and insulated by the dielectric substrate, and a power source connected to the first and second electrodes. The second electrode is disposed in a rearward direction relative to the first electrode. When activated, the device generates a plasma region that attracts an air flow passing underneath the vehicle, reducing the separation of the flow field and thereby reducing the impingement of the air flow on the ground and reducing the drag on the vehicle.

17 Claims, 4 Drawing Sheets

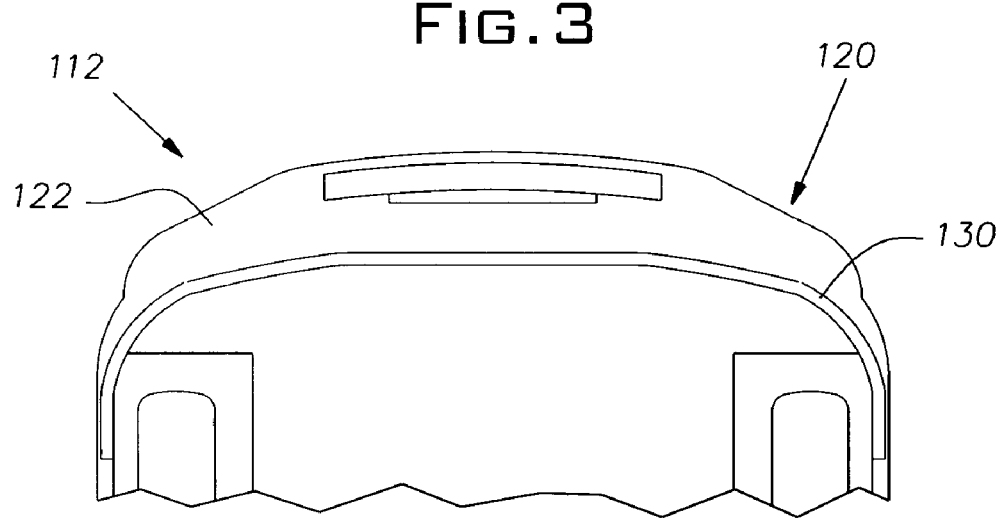
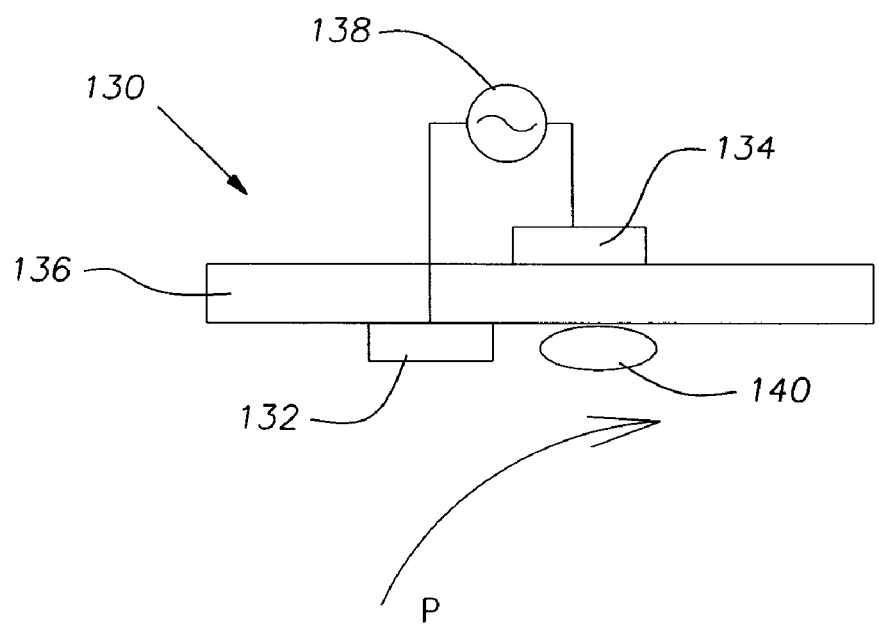

FRONT FASCIA PLASMA-INDUCED DRAG REDUCTION DEVICE

BACKGROUND OF THE INVENTION

In an attempt to optimize the energy used by vehicles, as well as improve vehicle performance, many factors relating to the air flowing around vehicles are considered. Particularly, to reduce the effect of aerodynamic drag, many vehicles are given streamlined, aerodynamic shapes. Such shapes allow the vehicle to slice through the air, thereby reducing the effect of drag on the vehicle. However, due to limitations presented by other facets of automotive design, automobile exteriors can only be streamlined to a certain extent. Thus, even the most streamlined, aerodynamic vehicles experience aerodynamic drag. Further, while a streamlined shape works well with high-performance sports vehicles or ultra-fuel efficient competition vehicles, other types of vehicles are not amenable to such a design. Particularly, certain sedans maintain a blunt front end for design reasons, while many trucks and SUVs maintain the blunt front ends out of both necessity and for stylistic reasons.

Vehicles having blunt front ends experience a higher level of drag, thereby deteriorating vehicle performance and efficiency. One such cause of drag is shown in FIGS. 1A and 1B. A vehicle 10 is shown driving in a forward direction. The vehicle 10 has a front end 12 holding the headlights 14, the vehicle grille 16, a front bumper 18, and a front fascia 20. The front fascia 20 is disposed immediately below the front bumper 18.

As the vehicle 10 travels in the forward direction, the front end 12 pushes through the air, creating an air flow field around the vehicle (shown by dotted lines and arrows). Vehicles with streamlined shapes tend to cut through the air more smoothly, thereby creating a less disruptive air flow field. However, the blunt front end 12 of the vehicle 10 severely deflects the air flowing around the vehicle 10.

As a result of the severe deflection of the air flow by the vehicle front end 12, the air flowing underneath the vehicle 10 impinges on the ground. FIG. 1B shows an expanded view of the vehicle front end 12, and shows in detail the cause of the impingement of the air flow on the ground. As the air flow runs into the front end 12, the air flows along the surface of the front end 12, down to the front fascia 20. As the front fascia 20 ends, the air separates from the surface and continues to flow tangentially to the surface of the front fascia 20, directly into the ground. Therefore, the bulk of the air flow is directed immediately into the ground.

After the air flow impinges on the ground, the bulk of the air flows along the surface of the ground, creating localized regions of increased pressure. The localized regions of increased pressure are shown in FIGS. 1A and 1B by the air flow lines being substantially clumped together along the ground. The increased pressure regions, in turn, result in a higher pressure on the vehicle, which, in turn, causes additional drag forces acting on the vehicle. The additional drag forces, as stated above, negatively impact the performance and efficiency of the vehicle 10.

Therefore, there is a need in the field for a vehicle front end that manipulates the air flow that passes underneath the vehicle so as to reduce the drag effect caused indirectly by the air flow impinging on the ground.

SUMMARY OF THE INVENTION

The present invention provides a vehicle front end that reduces the drag effect on the vehicle as compared to the vehicle front ends of the prior art. Particularly, the present invention provides a front fascia that manipulates air flowing underneath the vehicle so as to reduce air flow impingement on the ground, reduce localized high pressure regions of air flow underneath the vehicle, and thereby reduce the drag acting on the vehicle. The present invention reduces the drag by providing a plasma-induced drag reduction device on the vehicle front fascia.

The plasma-induced drag reduction device is mounted on an underside surface of the vehicle front fascia. The device applies a force on an air flowing past the underside of the front fascia in a direction toward the vehicle and away from the ground. The force applied to the air flow directs the air flow away from the ground, and therefore reduces the amount of air flow that impinges on the ground. The device is formed of a first and second electrode asymmetrically mounted on opposing surfaces of a dielectric substrate. The first electrode is exposed to the air, while the second electrode is completely insulated by the dielectric substrate. Further, the second electrode is disposed in a longitudinal position that is relatively nearer the rear of the vehicle in relation to the first electrode. Finally, the electrodes are connected to a power source that supplies an A/C voltage to the electrodes.

The plasma-induced drag reduction device can have a controller and a switch connected thereto that selectively connects and disconnects the first and second electrodes with the power source. Further, the controller can be in communication with a vehicle motion sensor, that detects when the vehicle is in motion and when the vehicle is stopped. By adding a controller and a switch to the system, the device can be selectively operated. Particularly, the device can be deactivated when not needed, resulting in a conservation of energy.

BRIEF DESCRIPTION OF THE DRAWINGS

These and further features of the present invention will be apparent with reference to the following description and drawings.

FIG. 3 illustrates an underside of the front fascia of the present invention.

FIG. 4 schematically illustrates a plasma actuator of the present invention.

DETAILED DESCRIPTION OF THE INVENTION

The invention will now be described in accordance with its preferred embodiments. The description with reference to the figures is intended to simplify the explanation of the invention and is not meant to limit the scope of the invention.

Figure 2A:
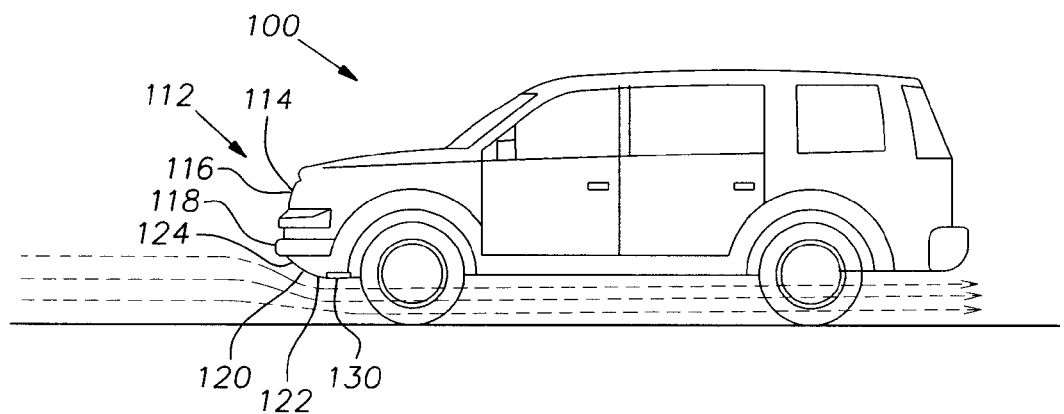
FIG. 2A illustrates air flow patterns underneath a vehicle having a front fascia of the present invention.
Figure 2B:
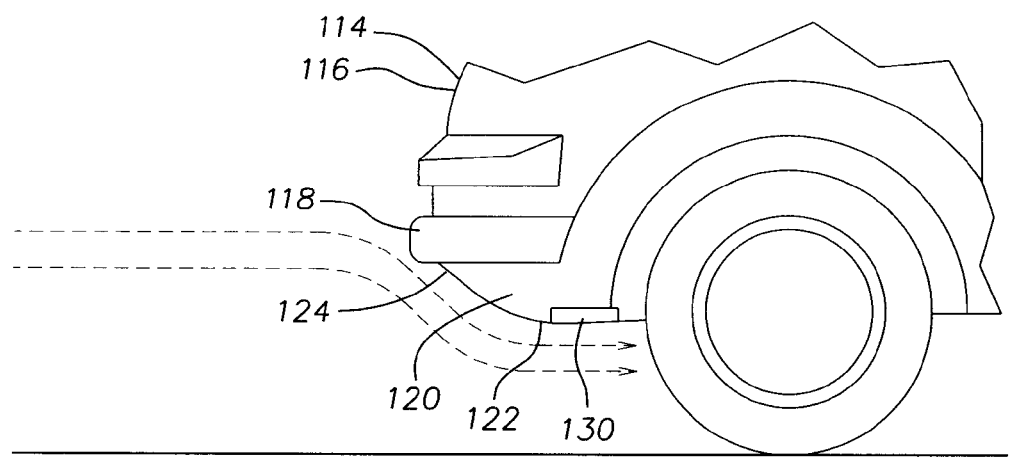
FIG. 2B illustrates a side view of the front fascia of the present invention with the air flow patterns shown.

With reference to FIGS. 2A and 2B, a vehicle 100 having a front fascia 120 of the present invention is shown. The vehicle 100 of the exemplary embodiment is a Sports Utility Vehicle, however, the present invention is amenable to all variety of automobiles. The vehicle 100 has a front end 112 where headlights 114, a grille 116, a front bumper 118, and the front fascia 120 are disposed. The front fascia 120 is mounted below the front bumper 118, and includes an underside surface 122 and a frontal surface 124. The frontal surface 124 is generally perpendicular to the ground, and tapers into the underside surface 122, which is generally parallel to the ground.

To solve the problems associated with drag encountered by conventional vehicles, the front fascia 120 of the present invention is provided with a plasma-induced drag reducing device 130 (hereinafter, "plasma actuator 130") mounted on the front fascia underside surface 122. FIG. 3 shows a view of the front fascia underside surface 122 from underneath the vehicle 100. As shown, the plasma actuator 130 is a long strip that extends the entire length of the front fascia underside 122 and may wrap around both ends of the front fascia 120. As will be discussed in further detail below, the plasma actuator can be mounted either on or within the front fascia underside 122, so long as a portion of the plasma actuator 130 is exposed to air.

Figure 5A:
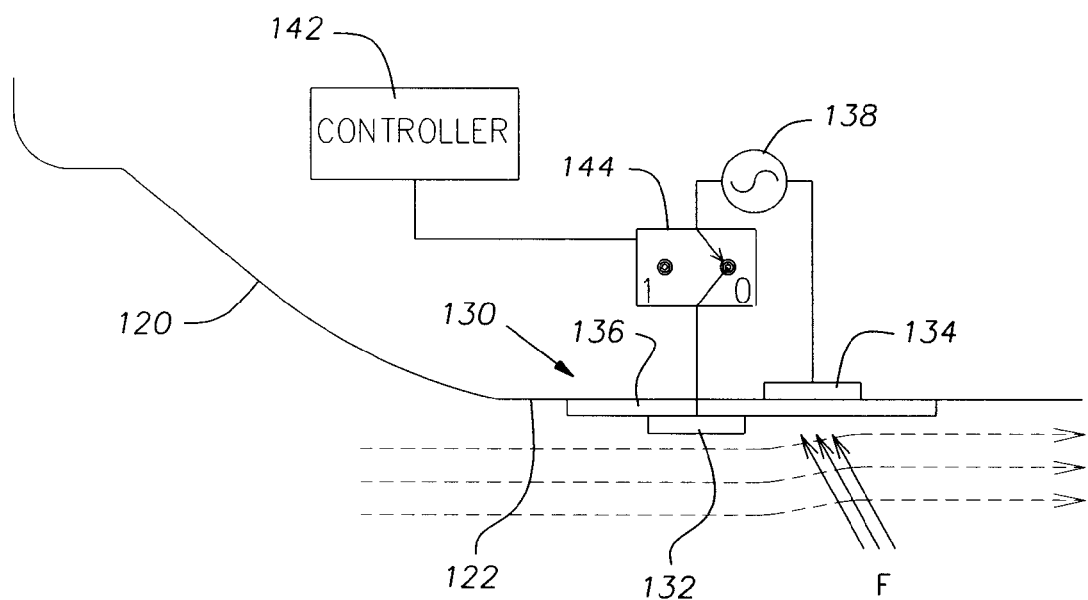
FIG. 5A illustrates the plasma actuator mounted on the front fascia of the present invention.
Figure 5B:
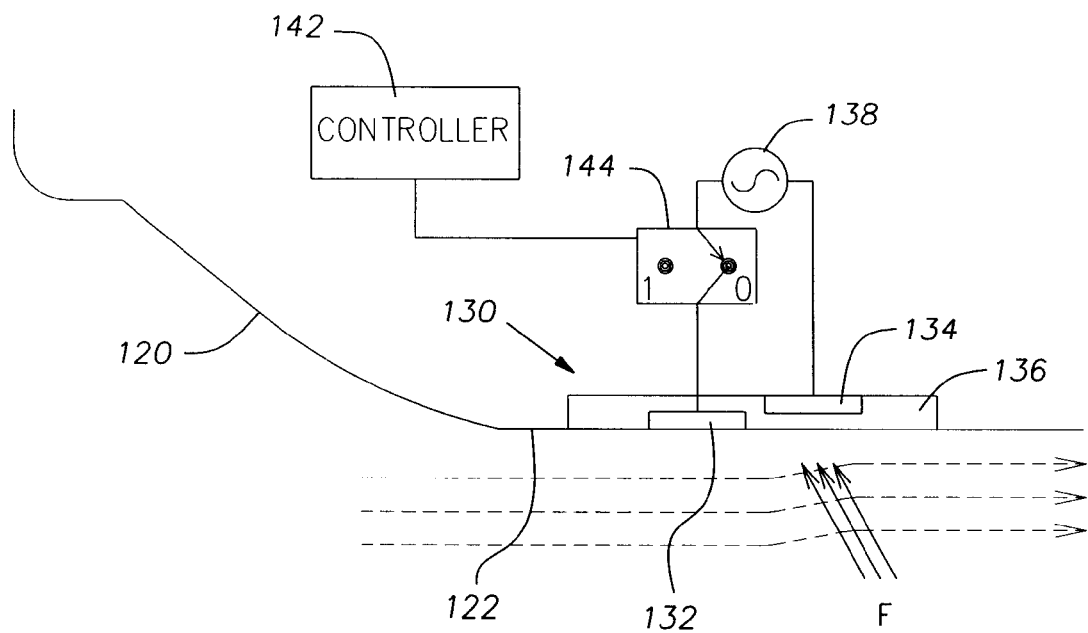
FIG. 5B illustrates an alternate embodiment of the plasma actuator mounted on the front fascia of the present invention mounted.

With reference to FIGS. 4, 5A, and 5B, a structure of the plasma actuator 130 will be described. Following the description of the structure, the operation of the plasma actuator 130 as mounted on the front fascia underside surface 122 of the vehicle 100 will be explained.

FIG. 4 shows a schematic illustration of the plasma actuator 130 separate from the front fascia 120, allowing for a simplified explanation of the plasma actuator 130. The plasma actuator 130 includes a first or outer electrode 132, a second or inner electrode 134, a dielectric substrate 136, and an A/C voltage source 138 (hereinafter, "power source 138").

The bulk of the body of the plasma actuator 130 is formed of the dielectric substrate 136. The dielectric substrate 136 may be formed of any dielectric material suitable for the application. Preferably, the dielectric substrate 136 is formed of a Kapton film. As the dielectric substrate 136 forms the base for the plasma actuator 130, the dielectric substrate 130 extends the full length of the front fascia 120, such that the full length of the plasma actuator 130 as shown in FIG. 3 is attributed to the dielectric substrate 130.

The electrodes 132, 134 are formed of a suitable conductive material. The first and second electrodes 132, 134 are mounted on opposing surfaces of the dielectric substrate 136, so as to be separated by the dielectric substrate 136. Particularly, the first electrode 132 is mounted on a bottom surface of the dielectric substrate 136, while the second electrode is mounted on a top surface of the dielectric substrate. As will be explained in further detail below, the first electrode 132 is exposed to the air, while the second electrode 134 is insulated by the dielectric substrate 136. Thus, it is necessary for the first electrode 132 to be mounted on the bottom surface of the dielectric substrate 136, while the second electrode 134 needs to be mounted on the top surface of the dielectric substrate 136.

Additionally, for the plasma actuator 130 to operate as desired with the front fascia 120 of the present invention, the first electrode 132 is mounted so as to be relatively nearer a front of the vehicle 100 than the second electrode 134. The electrodes 132, 134 are offset from one another and do not overlap each other. The precise amount of gap between the electrodes 132, 134 varies depending on the types of materials chosen and the specific application, however the amount of gap can be experimentally determined. The illustrated positioning of the electrodes 132, 134 is merely exemplary, as the electrodes 132, 134 can be mounted so as to have more or less of a gap between one another.

The electrodes 132, 134 are shown mounted on the dielectric substrate 136 in a sectional view. Each electrode 132, 134 is a long strip, and extends substantially the full length of the dielectric material 136.

The electrodes 132, 134 are directly electrically connected to the power source 138, which provides an A/C voltage to the first and second electrodes 132, 134. As shown in FIGS. 5A and 5B, the connection between the power source 138 and the electrodes 132, 134 need not be direct. The plasma actuator 130 can be better controlled through the use of controlling components, such as a switch 144, connected, between the power source 138 and the electrodes 132, 134. The use of the switch 144 will be discussed in detail below.

In operation, voltage passes from the power source 138 to the electrodes 132, 134, inducing ionization of the air near the first electrode 132. The ionized air is referred to as plasma, and is represented by a plasma region 140 in FIG. 4. For the air near the first electrode 132 to ionize, the first electrode 132 must be exposed to the air, while the second electrode 134 must be insulated by the dielectric substrate 136.

The plasma region 140 exerts a force on the surrounding ionized air as a result of a locally created magnetic field. Through this force exerted by the plasma region 140, the air flow underneath the vehicle 100 is redirected. As a result of the configuration of the plasma actuator 130, the plasma region 140 exerts an attractive force toward the plasma actuator 130. As a particle travels from left to right below the plasma actuator 130 of FIG. 4, the attractive force causes the particle to be attracted toward the plasma actuator 130, and the particle would travel along path P. The attractive force exerted by the plasma actuator 130 is utilized, when the plasma actuator 130 is mounted on the front fascia underside surface 122, to redirect the air flow beneath the vehicle 100 so as to reduce or eliminate flow separation, so as to reduce or eliminate air flow impingement on the ground.

The mounting of the plasma actuator 130 on the front fascia underside surface 122 is shown in detail in FIG. 5A. In the embodiment illustrated in FIG. 5A, the dielectric substrate 136 is mounted on the front fascia underside surface 122. As mounted, the second electrode 134 is disposed on the top surface of the dielectric substrate 136, so as to be held within the front fascia 120. The first electrode 132 is mounted on the bottom surface of the dielectric substrate 136, and is therefore disposed outside of the vehicle 100 and is exposed to the air. As mentioned above, the first electrode 132 is disposed relatively nearer a front of the vehicle 100 than the second electrode 134.

Further, the power source 138 is held within the front fascia 120. While the power source 138 is shown in FIG. 4 as being directly connected to both of the electrodes 132, 134, FIG. 5A shows the switch 144 interconnected between the power source 138 and the first electrode 132. The switch is further connected to a controller 142, with the controller 142 being operable to selectively actuate the switch 144. The addition of the switch 144 and the controller 142 allows for improved operation of the plasma actuator 130 by allowing for selective activation and deactivation of the plasma actuator 130.

Specifically, the switch 144 has a 1 position (hereinafter, "OFF position") and a 0 position (hereinafter, "ON position"). When the switch 144 is actuated to the OFF position, the circuit is open, and A/C voltage from the power source 138 does not pass to the electrodes 132, 134. When the switch 144 is actuated to the ON position, the circuit is closed, and A/C voltage from the power source 138 passes to the electrodes 132, 134. Therefore, the plasma actuator 130 can be operated only when desirable.

Generally, the plasma actuator 130 should be operated whenever the vehicle 100 is moving forward. Assuming this to be the case, the controller 142 and the switch 144 allow for the plasma actuator to be deactivated while the vehicle 100 is stopped, thereby conserving energy. Further, if it is determined that there are operating conditions wherein the vehicle 100 is moving, yet operation of the plasma actuator 130 is not desired, the plasma actuator 130 can be deactivated. Specifically, the controller 142 can be set to recognize the condition and accordingly actuate the switch 144 to the OFF position, thereby deactivating the plasma actuator 130. One such condition for deactivating the plasma actuator 130 includes slow speed operation (under 20 Km/hr).

In this regard, a vehicle movement sensor (not shown) is provided. Generally, the sensor is provided in the form of a speed sensor, and therefore only needs to be connected to the controller 142. When the vehicle movement sensor detects that the vehicle 100 is in motion, the controller 142 actuates the switch 144 to the ON position. When the vehicle movement sensor detects that the vehicle 100 is stopped, the controller 142 actuates the switch 144 to the OFF position. The vehicle movement sensor is discussed as one type of sensor that can be operated in conjunction with the controller 142 to activate and deactivate the plasma actuator 130. If additional operating conditions are identified wherein the plasma actuator 130 should be activated or deactivated, sensors to detect those operating conditions can be added to the system and placed in communication with the controller 142.

When the plasma actuator 130 is deactivated, the air flow underneath the vehicle 100 will follow the same path as the shown for the conventional front fascia. However, the when the plasma actuator 130 is activated, the plasma region 140 will exert an attractive force F on the passing air flow so as to redirect the air flow toward the vehicle 100 and away from impingement on the ground. As shown in FIG. 5A, when the plasma actuator 130 is activated, the attractive force F acts in a direction toward the plasma actuator 130 and the vehicle 100. As a result, the air flow passing underneath the vehicle is drawn toward the vehicle 100 by the force F. Particularly, rather than tangentially deflecting from the front fascia 120 directly into the ground, the air flow is drawn to the vehicle 100 and follows the curve of the front fascia 120, thereby reducing the impingement of the air flow on the ground. Thereafter, the air flow field underneath the vehicle 100 will follow the path shown in FIG. 2A. As the air flow impingement on the ground is reduced or eliminated, the high pressure regions that result in additional drag are likewise diffused, reducing the drag acting on the vehicle 100.

Figure 1A:
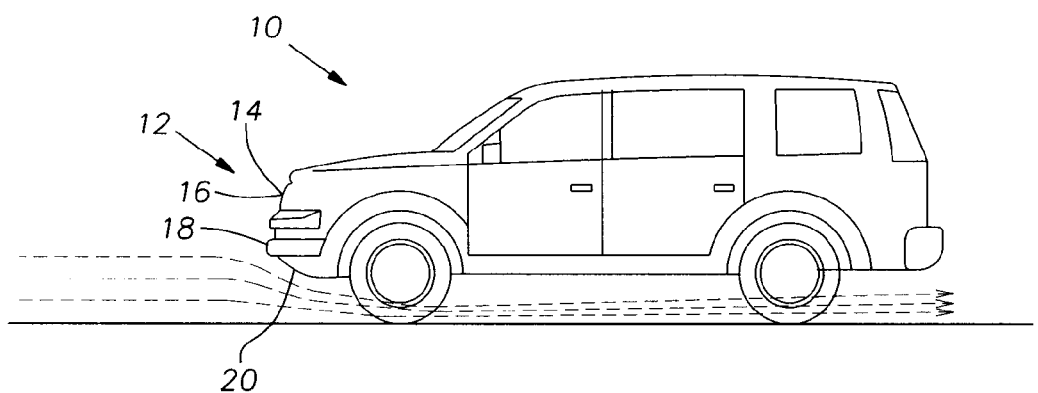
FIG. 1A illustrates air flow patterns underneath a vehicle having a front fascia of the prior art.
Figure 1B:
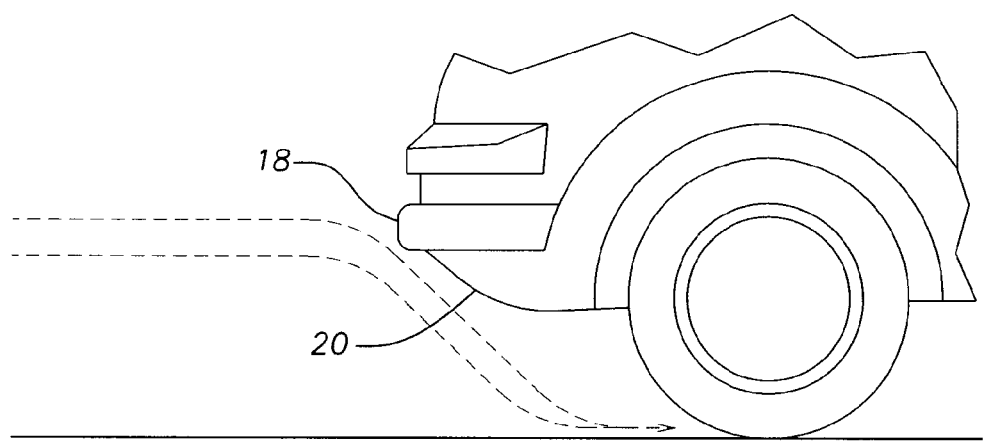
FIG. 1B illustrates a side view of the front fascia of the prior art with the air flow patterns shown.

Comparing the air flow field underneath the vehicle 100 shown in FIG. 2A with the air flow field underneath the vehicle 10 shown in FIG. 1A reveals the improvement provided by the present invention. The air flow underneath the vehicle 10 of FIG. 1A is immediately directed toward the ground, and then continues along the ground in compacted, high pressure regions. However, with the plasma actuator 130 activated, the air flow underneath the vehicle 100 is prevented from being immediately directed toward the ground. Rather, the air flow follows a shape of the front fascia 120, and continues to travel underneath the vehicle 100 in a diffuse manner so as to prevent the high pressure regions associated with the conventional vehicle 10 shown in FIG. 1A. The diffusion of the high pressure regions as a result of the attractive force F exerted by the plasma actuator 130 is shown by the additional spacing between the dotted lines and arrows representing the air flow in FIGS. 2A and 2B, as compared with the spacing shown in FIGS. 1A and 1B.

The exact amount of force F required to sufficiently redirect the air flow to affect a sufficient reduction in drag varies, and can be experimentally determined. To achieve a desired force F, an A/C voltage of tens of thousands of volts from the power source 138 is generally required.

By eliminating the high pressure regions of air flow beneath the vehicle 100, the drag effect on the vehicle 100 is likewise reduced. Consequently, vehicle performance and efficiency are improved.

With reference to FIG. 5B, an alternate embodiment of the plasma actuator 130 is shown. The embodiment shown in FIG. 5B eliminates all protrusion of the plasma actuator 130 from the front fascia underside surface 122. It is noted that the protrusion of plasma actuator 130 as shown in FIG. 5A is minimal. Particularly, the electrodes 132, 134 have a thickness of less than 1 mm, while the dielectric substrate 136 has a thickness of approximately 1 mm. Therefore, the protrusion is minute and does not noticeably affect a deflection of air flow beneath the vehicle 100. However, the embodiment shown in FIG. 5B does provide an improvement over that of FIG. 5A, and can be utilized as an incremental improvement in conjunction with other measures seeking to minimize the exposure of the air flow underneath the vehicle 100 to deflecting means.

In FIG. 5B, the plasma actuator 130 is constructed and mounted so as to not protrude from the front fascia underside 122. To eliminate the protrusion, two modifications to the plasma actuator 130 and the front fascia 120 are made. First, the first and second electrodes 132, 134 are mounted within an indentation formed in the dielectric substrate 136. While the second electrode 134 can be completely encapsulated by the dielectric substrate 136, the first electrode 132 requires at least a surface be exposed to the air. Ideally, the first electrode 132 is mounted so as to have an exposed surface that is flush with the bottom surface of the dielectric substrate 136. Thus, the first electrode 132, second electrode 134, and the dielectric substrate 136 of the plasma actuator 130 are contained within dielectric substrate 136, with no protruding portions.

Second, the dielectric substrate 136 having the electrodes 132, 134 mounted therein is itself mounted within an indentation formed in the front fascia underside surface 122. Ideally, the indentation formed in the front fascia underside surface 122 is sized so as to hold the plasma actuator 130 such that the bottom surface of the dielectric material 136 and the exposed surface of the first electrode 132 are flush with the underside surface 122. According to this embodiment, all of the benefits associated with the embodiment illustrated in FIG. 5A are achieved, while also reducing surfaces underneath the vehicle 100 from which air flow can be deflected from.

The present invention has been described according to a preferred embodiment. The preferred embodiment is merely illustrative of the invention, and is not meant to limit the scope of the invention. It is considered apparent that one skilled in the art would recognize that the present invention is amenable to various modifications and alterations. All such modifications and alterations are considered to be within the scope of the invention.

An exemplary modification involves the use of a variable switch in the embodiments shown in FIGS. 5A and 5B. As discussed above, the switch 144 has an ON position and an OFF position, and therefore operates to either connect or disconnect the electrodes 132, 134 from the power source 138. However, the use of a variable switch would allow the switch to control the amount of A/C voltage that passes from the power source 138 to the electrodes 132, 134. The force F is increased with more voltage passing to the electrodes 132, 134, and decreases with less voltage. Therefore, by providing a variable switch to incrementally increase or decrease the A/C voltage passing to the electrodes 132, 134, the strength of the attractive force F can be incrementally manipulated. To achieve this, the variable switch can be provided with several position corresponding to the amount of voltage that is allowed to pass. For example, the variable switch can have a HIGH position, a MEDIUM position, a LOW position, and an OFF position, where the most voltage passes at the HIGH position, and decreases until no voltage passes at the OFF position.

Additionally, the variable switch can allow for a continuous voltage output from a maximum value to a value of zero. Accordingly, rather than the stepped positions above, the voltage output would change according to a linear function based on external conditions (such as vehicle speed).

What is claimed is:

1. A plasma-induced drag reduction device mounted on an underside surface of a front portion of a vehicle, comprising:
   a dielectric substrate formed of a dielectric material;
   a first electrode mounted on the dielectric substrate so as to be exposed to atmosphere;
   a second electrode mounted on the dielectric substrate so as to be insulated from atmosphere;
   a power source connected to the first and second electrodes, the power source supplying a voltage to the electrodes;
   a switch disposed between at least one of a connection between the power source and the first electrode and the power source and the second electrode; and
   a controller connected to the switch,
   wherein the first and second electrodes are mounted with the first electrode disposed in a longitudinal position toward a front of the vehicle relative to the second electrode,
   wherein said switch is selectively actuated between an on position and an off position, wherein when said switch is in the on position, voltage passes from the power source to the electrodes, and when the switch is in the off position, voltage does not pass from the power source to the electrodes, and
   wherein the controller actuates the switch to the on position when the vehicle is traveling faster than a predetermined speed, and actuates the switch to the off position when the vehicle is traveling slower than the predetermined speed, said predetermined speed being greater than zero.

2. The plasma-induced drag reduction device according to claim 1, wherein the dielectric substrate is a Kapton film.

3. The plasma-induced drag reduction device according to claim 1, wherein the device has a length dimension that is greater than 75% of a width of the front portion of the vehicle.

4. A plasma-induced drag reduction device mounted on an underside of a front portion of a vehicle, comprising:
   a dielectric substrate formed of a dielectric material;
   a first electrode mounted on the dielectric substrate so as to be exposed to atmosphere;
   a second electrode mounted on the dielectric substrate so as to be insulated from atmosphere; and
   a power source connected to the first and second electrodes, the power source supplying a voltage to the electrodes,
   wherein the first and second electrodes are mounted with the first electrode disposed in a longitudinal position toward a front of the vehicle relative to the second electrode, and
   wherein the first electrode comprises a top surface, a bottom surface, and two side surfaces, and
   the first electrode is mounted on the dielectric substrate so that the top surface and two side surfaces are insulated by the dielectric substrate, and said bottom surface is flush with a bottom surface of the dielectric substrate.

5. The plasma-induced drag reduction device according to claim 1,
   wherein said switch is selectively actuated between at least three positions, the at least three positions comprising the off position,
   wherein when the switch is in any of the non-off positions, a voltage passes from the power source to the electrodes, wherein a unique voltage is associated with each of the at least three positions.

6. A vehicle, comprising:
   a body having a front fascia disposed at a front end of the vehicle, the front fascia having an underside surface disposed adjacent to an underside of the vehicle;
   a plasma-induced drag reduction device mounted on the underside surface of the front fascia, the plasma-induced drag reduction device configured to selectively exert an attractive force on an air flow under the vehicle; and
   a controller configured to control operation of the plasma-induced drag reduction device,
   wherein the controller is configured to turn the plasma-induced drag reduction device on when a vehicle speed exceeds a predetermined threshold greater than zero such that the attractive force is exerted on the air flow under the vehicle, and to turn the plasma-induced drag reduction device off when the vehicle speed is less than the predetermined threshold such that no attractive force is exerted on the air flow under the vehicle.

7. The vehicle according to claim 6, wherein the plasma-induced drag reduction device comprises:
   a dielectric substrate formed of a dielectric material;
   a first electrode mounted on the dielectric substrate so as to be exposed to atmosphere;
   a second electrode mounted on the dielectric substrate so as to be insulated from atmosphere;
   a power source connected to the first and second electrodes, the power source supplying a voltage to the electrodes,
   wherein the first and second electrodes are mounted with the first electrode disposed in a longitudinal position toward a front of the vehicle relative to the second electrode.

8. The vehicle according to claim 6, wherein a bottom surface of the drag reduction device is flush with the front fascia underside surface.

9. The vehicle according to claim 8, wherein the plasma-induced drag reduction device comprises:
   a dielectric substrate formed of a dielectric material;
   a first electrode mounted on the dielectric substrate so as to be exposed to atmosphere;
   a second electrode mounted on the dielectric substrate so as to be insulated from atmosphere;
   a power source connected to the first and second electrodes, the power source supplying a voltage to the electrodes,
   wherein the first and second electrodes are mounted with the first electrode disposed in a longitudinal position toward a front of the vehicle relative to the second electrode.

10. The vehicle according to claim 9, wherein the first electrode comprises a top surface, a bottom surface, and two side surfaces, and
    the first electrode is mounted on the dielectric substrate so that the top surface and two side surfaces are insulated by the dielectric substrate, and said bottom surface is flush with a bottom surface of the dielectric substrate.

11. The plasma-induced drag reduction device according to claim 6, wherein the device has a length dimension substantially equal to a width of the front portion of the vehicle.

12. A method for altering a vehicle aerodynamic profile, comprising:

detecting vehicle speed;

actuating a switch to an on position, wherein a voltage is allowed to pass from a power source to electrodes mounted in a plasma-induced drag reduction device, when the detected vehicle speed exceeds a predetermined threshold; and generating a plasma region with the plasma-induced drag reduction device that exerts a force acting in a direction toward an underside of a vehicle when the switch is actuated to the on position.

13. The method of claim 12, further comprising the steps of:

actuating the switch to an off position, wherein a voltage is not allowed to pass form the power source to the two electrodes in the plasma-induced drag reduction device, when the detected vehicle speed is less than the predetermined threshold.

14. The plasma-induced drag reduction device according to claim 1, wherein the predetermined threshold is 20 km/hour.

15. The vehicle according to claim 6, wherein the predetermined threshold is 20 km/hour.

16. The method of claim 12, wherein the predetermined threshold is 20 km/hour.

17. The method of claim 13, wherein the predetermined threshold is 20 km/hour.

* * * * *